May 28, 1929. F. W. SPERR, JR 1,715,253
GAS AND LIQUID CONTACT APPARATUS AND METHOD
Filed April 9, 1925 4 Sheets-Sheet 1
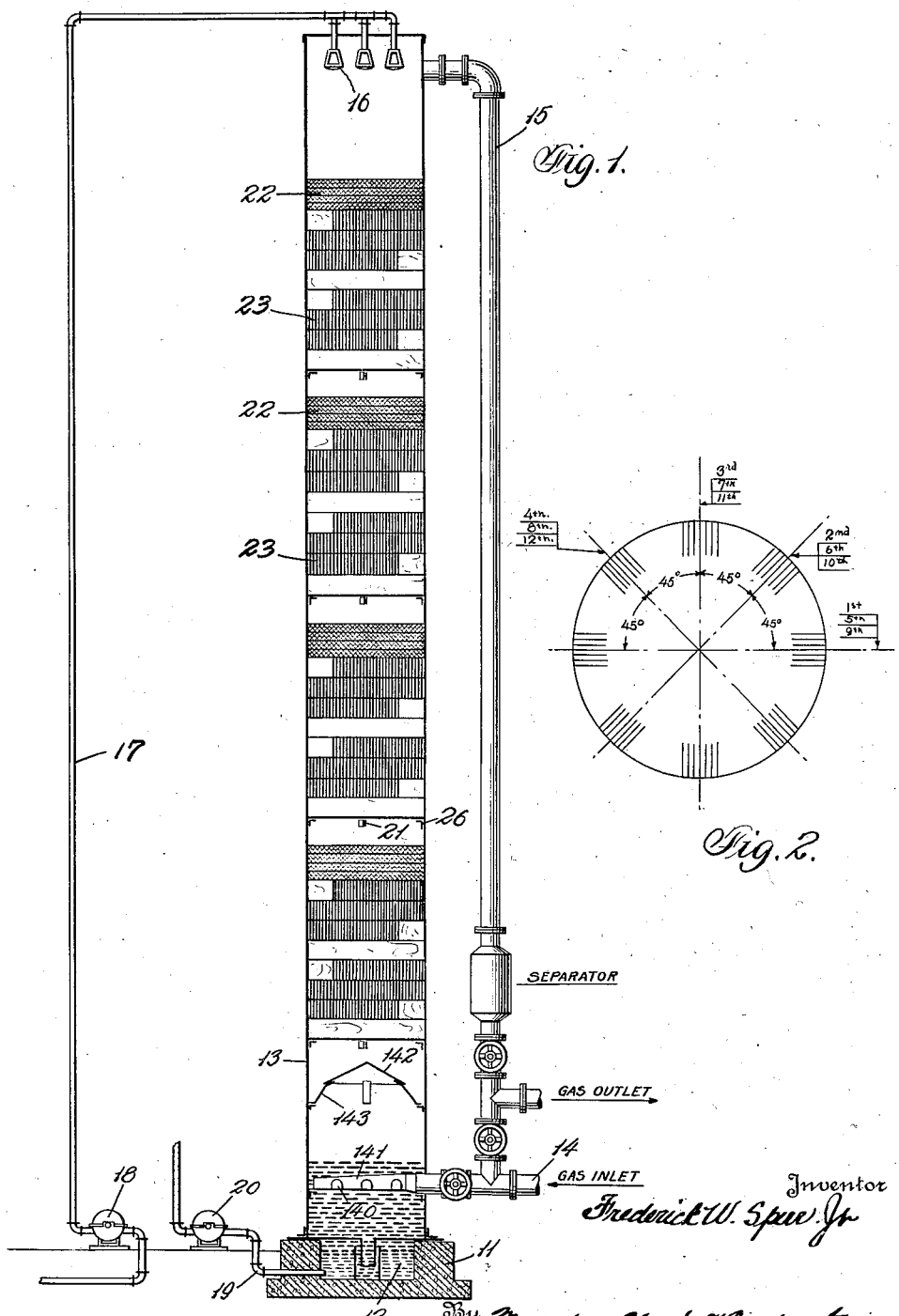

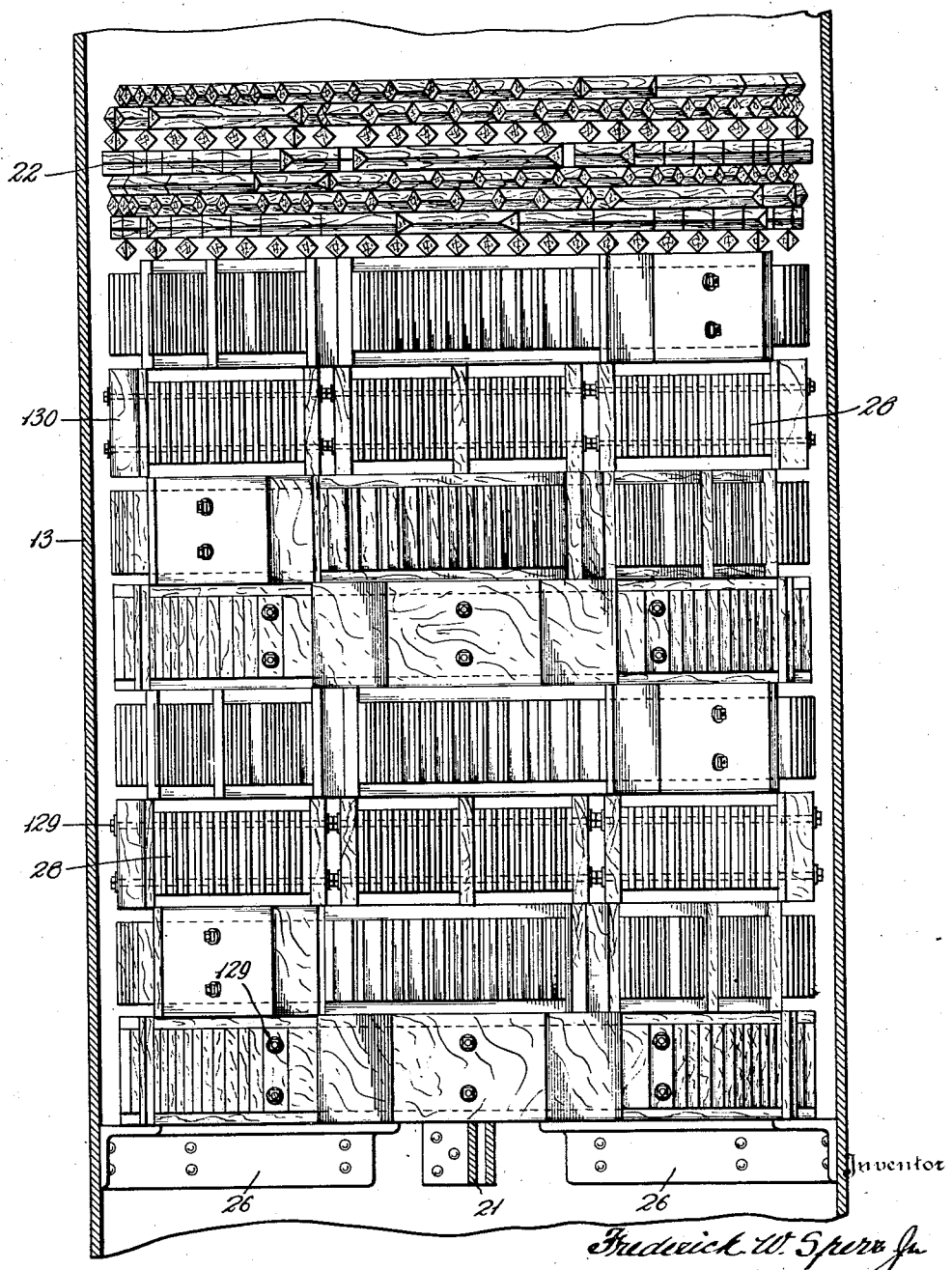

May 28, 1929.    F. W. SPERR, JR    1,715,253
GAS AND LIQUID CONTACT APPARATUS AND METHOD
Filed April 9, 1925    4 Sheets-Sheet 3

Inventor
Frederick W. Sperr Jr
By Munday Clark & Carpenter
his Attorneys

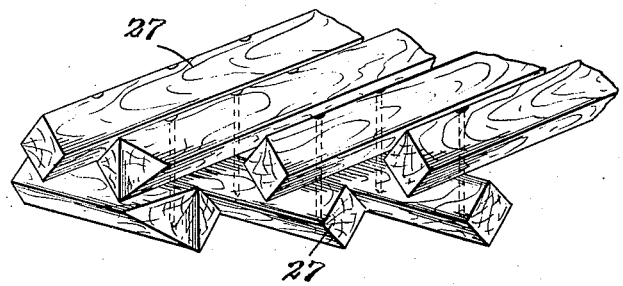
Fig. 5.
Fig. 6.
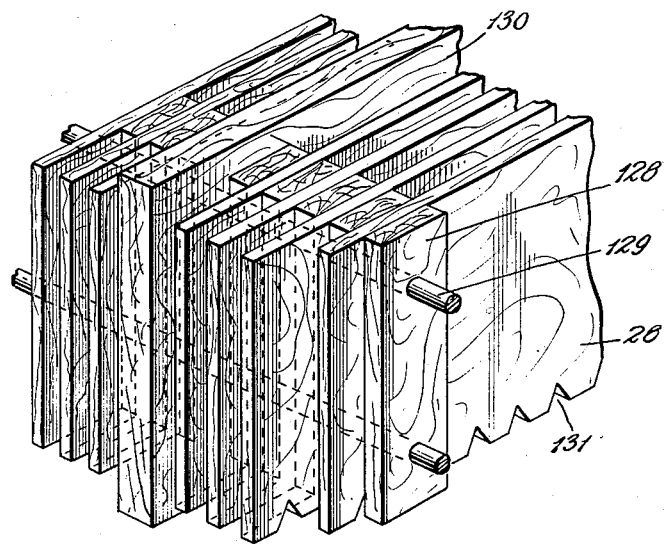

Patented May 28, 1929.

1,715,253

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS AND LIQUID CONTACT APPARATUS AND METHOD.

Application filed April 9, 1925. Serial No. 21,980.

This invention relates to gas and liquid contact apparatus, more particularly for the removal of impurities, for example, hydrogen sulphide and other noxious constituents, such as hydrocyanic acid, from gases containing them, by the so-called liquid purification.

The primary object of the invention is to provide an efficient gas and liquid contact apparatus that is more especially suitable for carrying out either the absorption stage or the regeneration stage of a liquid purification process, for example, the processes described in the assignee's applications, Ser. No. 21,981, filed April 9, 1925; Ser. No. 21,982, filed April 9, 1925; and Ser. No. 21,983, filed April 9, 1925 and assignee's earlier applications Ser. No. 718,253, filed June 6, 1924, and Ser. No. 730,676, filed Aug. 7, 1924, with a minimum of resistance to the flow of the gas, and with cheapness and simplicity of construction; and it may also be useful for other gas and liquid contact apparatus, such, for example, as benzol washers.

The invention consists in providing in an apparatus for the purpose referred to, a filler presenting a multitude of openings to the flow of the media and composed of successive strata of distributive and contact filler, the former being composed of elements having surfaces oblique to the flow and the latter composed of elements having surfaces parallel to the flow, of the said media.

The invention further consists in such other new and useful improvements, and has for further objects such other operative advantages or results, as may be found to obtain in the processes and apparatus hereinafter described or claimed.

In the accompanying drawings, forming a part of this specification, and showing, for purposes of exemplification, two preferred forms and manners in which the invention may be embodied and practiced, but without limiting the claimed invention to such illustrative instances:

Figure 1 is a vertical sectional elevation of a gas and liquid contact tower of small diameter constructed in accordance with the improvements of the present invention;

Figure 2 is a diagram indicating the preferred mode of stacking the trays of filler in the tower;

Figure 3 is a fragmentary sectional elevation showing a contact stratum and a distributive stratum for a tower of relatively large diameter;

Figures 5 and 6 are detail views of the distributive and contact filler respectively.

The same characters of reference designate the same parts in each of the several views of the drawing.

Figure 4:
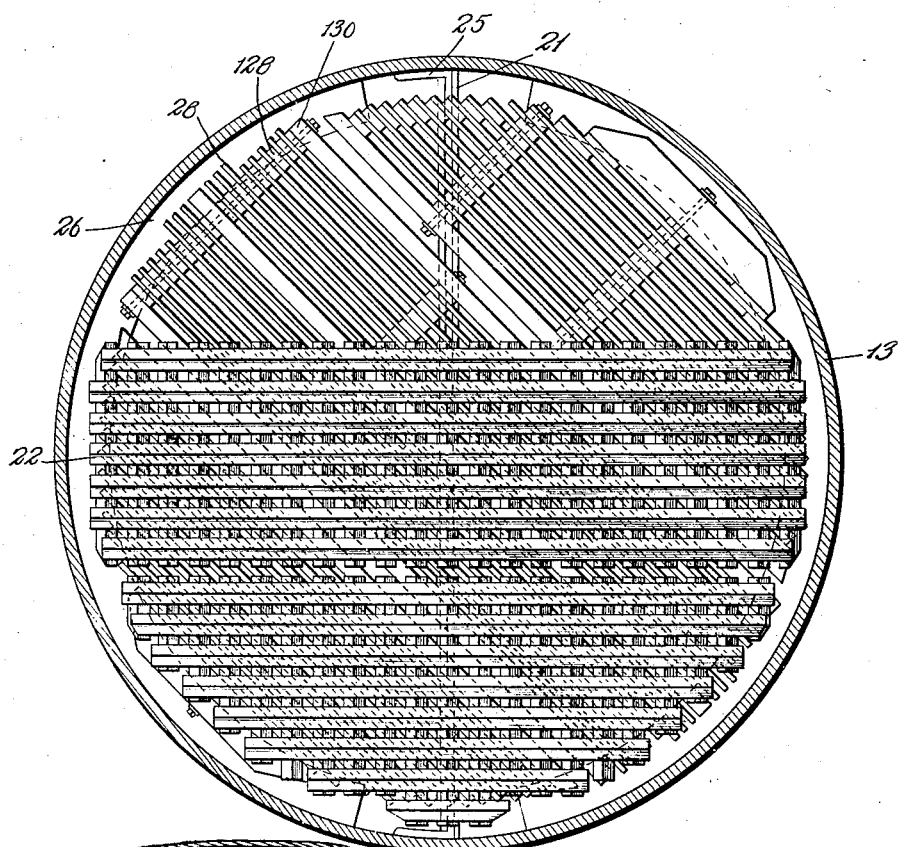
Figure 4 is a plan view of the strata of Fig. 3, with part of the distributive stratum removed to show the underlying contact stratum.

The drawings show the invention as applied to an absorber for effecting the removal of noxious constituents from gases.

In these drawings, and more particularly Figure 1, there is shown a foundation 11 provided with a well or sump 12, a tower 13 being supported on the top of the foundation 11 and forming the body of the apparatus. The gas to be purified enters the bottom of the tower through a gas inlet 14, and the purified gas passes out of the upper end of the tower through a discharge pipe 15. The lower part of the tower has cracker pipes 140 to which the gas is conducted through a manifold 141. The gas bubbles through the liquid in the base of the tower, into which the cracker pipes dip (the liquid level being maintained as in aforesaid application Ser. No. 21,983), and then passes up around a conical baffle 142 which has the function of preventing spray from the bubbling device splashing up on to the filler and which also has other useful purposes such as catching and deflecting the liquid from the hurdles so that it will wash down the sides of the tower and remove any solid matter that may be there deposited. The baffle is supported by legs 143 attached to an angle iron 144 secured to the wall of the tower. The absorption solution is supplied to the upper end of the tower from a system of sprayers 16 connected by a solution supply line 17 with a pump 18; and the spent solution may also be discharged from the bottom of the tower 13 into the sump 12, from which the fouled solution may be pumped through a line 19 by a pump 20 for subsequent regeneration or actification. As the solution flows downwardly through the tower 13, it meets the ascending gas and absorbs the noxious constituents contained therein.

The present invention provides means for effecting efficient distribution and extensive surface contact between the countercurrents of gas and liquid in the tower 13, with avoidance of excessive resistance to the flow of the media, for which purpose the tower contains successive strata of distributive and contact filler, the former offering oblique surfaces and the latter parallel surfaces to the flow of the media. As shown in Figure 1, the tower contains four such strata of each kind. However, a single stratum, or any convenient number of strata, of each kind may be provided in the tower, dependent on the height thereof.

Figure 7:
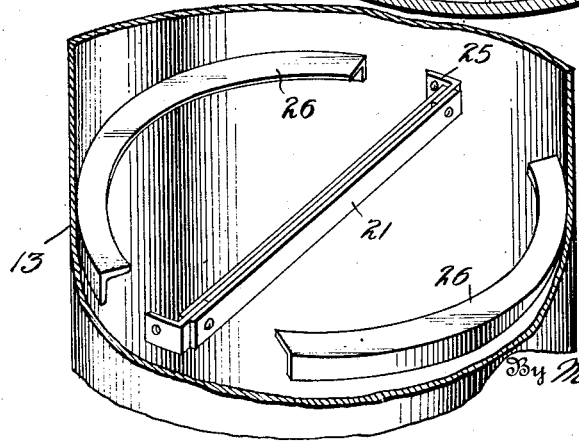
Figure 7 is a detail view showing the means for supporting the filler in the tower.

The supporting agencies for the filler strata consists (see especially Fig. 7), of diametrical beams and circumferential ledges having their upper surfaces lying in the same horizontal plane. The former consists of a pair of parallel horizontal cross-beams 21 arranged diametrically of the tower, of small sectional area across a horizontal plane and secured at their ends by angle brackets 25 to the tower wall. The circumferential ledges 26 consist of suitably curved lengths of angle iron secured to the tower wall in convenient symmetrical location relatively to the beams 21 as shown in Fig. 7. By providing a sufficient number of these beams and ledges a strong and rigid support of the filler strata is obtained with but slight sacrifice of open and free space for the passage of the gas and with very little tendency for the gas to divide and channel, or for the liquid to cling to the sides of the tower and pass downward in relatively large masses or streams.

The distributive filler stratum 22 is a grid-like structure of superposed layers of bars 27 of polygonal cross-section, the vertical sections across a longitudinal axis being shown of approximately diamond shape in Fig. 5. The bars in each layer are parallel and run at an angle of 90° or thereabout to the bars of the next layer so as to form a grid structure presenting a multitude of openings for the flow of the gas and liquid. The bars are arranged with the major diagonals of the diamond horizontal whereby the bars of one layer contact with the bars of the next layer with their angular edges. The openings are thus constricted being formed by converging surfaces oblique to both the downflow and the upflow.

The bars, preferably of wood, are assembled in trays each consisting of two layers, by means of nails driven through the bars at the places of intersection as shown in Fig. 5, and each distributive stratum may contain any suitable number of trays. In the apparatus of Figs. 1 and 3 four trays are shown in each stratum.

The several layers of the aforesaid oblique walled filler strata cause the countercurrent streams of gas and liquid to be divided and projected in diverse directions, and the subdivisions of the streams to be divided again and again projected in diverse directions as before, and thus distribute such streams of gas and liquid to the contact producing and relatively less resistive filler stratum 23, which lies beneath and adjoining the above described distributing stratum.

The contact stratum 23 comprises a grid-like structure of superposed layers of bars 28, of which the vertical cross sections are in the form of narrow rectangles, having their longer sides vertical. The bars 28 of each layer are spaced by distance pieces 128 and held in assemblage by bolts 129 in such fashion that they lie parallel and at a suitable distance apart. Each tray of contact filler contains a single layer of bars, and the contact trays are deeper or thicker than the distributive trays, as will be seen from Figs. 1, 3, 5, 6. To give vertical spacing between successive trays, and also to provide strength, a number of bars 130 of greater depth and thickness are provided in each tray. The bars 28, preferably of wood, are preferably formed with notches 131 as shown in Fig. 6 to cause the liquid to drip from the bars in broken streams.

In the examples shown in Figs. 1 and 3 each contact filler stratum contains eight trays. The several layers forming the contact filler stratum, cause the countercurrents of the solution and the gas to be exposed to each other over relatively large and open surfaces, and offer a relatively small resistance to the flow of the gas.

The trays, whether of distributive or contact filler, are preferably stacked in the tower with the bars of each tray running at 45° or thereabout to those of the next tray. Fig. 2 illustrates a convenient stacking scheme for the twelve trays (four distributive and eight contact) supported by each set of bars and ledges in the apparatus of Fig. 1. In this scheme employing the points of the compass for convenience in reckoning, the first, fifth, and ninth tray, counting from the top, have their bars extending from east to west; the second, sixth and tenth trays have their bars extending from north-east to south-west; the third, seventh and eleventh trays have their bars extending from north to south; and the fourth, eighth and twelfth trays have their bars extending from north-west to south-east.

In towers of comparatively small diameter, say under about four or five feet, the trays are each in a single piece or unit of configuration approximating as nearly as possible to the contour of the tower, usually circular. In towers of large diameter it is preferred to subdivide the trays, for example into segmental fractions as shown in Figs. 3 and 4, which improves the construction in respect of strength and convenience of erection. Also in Fig. 1 the filler strata are arranged so that the liquid traverses a distributive stratum before entering a contact stratum.

It should be noted that the distributive functions of the invention are especially promoted by providing a plurality of alternating distributive and contact filler strata, as shown in Figs. 1 and 3, causing the distribution to be reeffected at several places during the course of travel of the gas and liquid through the tower. The resistance to the flow offered by a distributive stratum is relatively great, that offered by a contact stratum small, and suitable proportioning of the amounts of the two kinds of strata in the tower provides optimum conditions with respect to contact between the media and flow resistance. In such an installation, the liquid dropping from a contact stratum which, by reason of its construction, causes the liquid to concentrate in channels distributed relatively unevenly in the tower, falls upon the succeeding distributive stratum and is redistributed over the cross sectional area of the tower before passing to the next contact stratum.

With a gas and liquid contact apparatus provided with filler strata and supports for the same, made up in the manner above described, the currents of solution and gas which flow in opposite directions through the apparatus are well distributed throughout the filler, while at the same time large intersurfaces of the same are exposed to contact with each other, while the back pressure, or resistance to the flow of the gas is kept small, and simplicity and cheapness of construction are attained. Short circuiting or channeling of either the gas or the liquid is minimized, and great efficiency in the desired interaction between the solution and the gas is promoted.

The apparatus has an important application in practicing gas purification in accordance with the processes described and claimed in the other applications hereinbefore referred to wherein the gas to be purified is brought into direct contact with an alkaline absorbent agent, such as a liquid containing sodium carbonate, and the absorbent agent containing the absorbed impurities then aerated with rejuvenation of the solution.

The invention as hereinabove set forth or exemplified may be variously practiced or embodied within the scope of the claims hereinafter made.

I claim:

1. A gas and liquid contact apparatus comprising a body or tower containing a filler presenting a multitude of openings for the flow of the media, and comprising successive strata of distributive and contact fillers, the distributive filler being composed of a plurality of layers of spaced elements having surfaces oblique to the flow of said media and arranged with the elements of each layer disposed at an angle to the elements in other layers of said stratum and the contact filler composed of a plurality of layers of spaced elements having surfaces parallel to the flow of the said media and arranged with the elements of each layer disposed at an angle to the elements in other layers of said stratum.

2. An apparatus as claimed in claim 1 with counter-flow of liquid and gas therein, thereby characterized that the filler strata are so arranged that the liquid traverses a distributive stratum before entering a contact stratum and the contact stratum is arranged below the distributive stratum with the minimum of free space between said strata.

3. An apparatus as claimed in claim 1, thereby characterized that the distributive stratum of filler is a grid-like structure of superposed layers of bars of polygonal cross-section having the bars in one layer contacting with the bars in another layer at their angular edges and having their oblique surfaces arranged to form constricted openings for the flow of the media.

4. An apparatus as claimed in claim 1, thereby characterized that the contact stratum of filler is a grid-like structure of superposed layers of bars of narrow rectangular cross-section disposed with the major axes vertical, each layer of bars having a number of bars of greater depth to provide vertical spacing between successive layers in the contact stratum.

5. An apparatus as claimed in claim 1, in which the filler strata are supported in successive sets of contiguous distributive and contact strata in the body of the apparatus by horizontal cross-beams and peripheral ledges together supporting a plurality of strata, as herein described.

6. An apparatus as claimed in claim 1, in which each distributive and each contact stratum consists of a plurality of trays wherein the component bars are rigidly fastened together.

7. An apparatus as claimed in claim 1, in which each distributive and each contact stratum contains trays superposed with their bars rigidly secured in the trays and arranged at an angle to the bars of the next unit.

8. A method of effecting contact of gas and liquid, for the purposes of gas purification and the like, comprising effecting the horizontal spreading of gas and liquid in a distributive zone previous to the passage of gas and liquid into a contact zone, by passing the liquid and gas in counter-current with each other and successively through a plurality of alternating shallow distributive zones presenting laterally extended resistance to the vertical flow and deep contact zones affording extensive contact surfaces and relatively small resistance to the vertical flow.

9. Apparatus as claimed in claim 1 in which the distributive stratum of filler is a grid-like structure of a plurality of superposed layers of adjoining bars of wide polygonal cross-section having their oblique surfaces arranged to form constricted aperturing for the flow of the media, and the contact stratum of filler is a grid-like structure of superposed layers of bars of narrow cross-section and disposed with the major surfaces vertical and that are substantially deeper than the bars in the distributive stratum.

10. A gas treatment distributive and contact apparatus section comprising a plurality of tiers spaced one from another, each tier comprising a shallow stratum consisting of a plurality of layers of relatively thick bars having their surfaces obliquely arranged, the bars in each layer crossing and adjoining the bars in an adjacent layer and forming shallow constricted openings, and a relatively deeper stratum consisting of a plurality of layers of relatively thin bars having their major surfaces in substantially vertical planes, the said last mentioned bars in each layer crossing the bars in an adjacent layer and forming deep constricted openings; whereby gas and liquid are, after leaving each contact stratum, uniformly spread horizontally previous to entering a next contact stratum.

11. In apparatus for effecting contact of gas and liquid, in combination: a vertical tower having a succession of alternating strata of distributive bars and contact bars therein with the contact bars presenting relatively extended contact surfaces and being spaced so as to permit relatively free passage of gas and with the distributive bars presenting relatively limited contact surface and being closely spaced so as to baffle and distribute the gas and liquid over the cross-sectional area of the tower.

In testimony whereof I have hereunto set my hand.

FREDERICK W. SPERR, Jr.